United States Patent
Suchak et al.

(10) Patent No.: US 7,303,735 B2
(45) Date of Patent: Dec. 4, 2007

(54) PROCESS FOR THE REMOVAL OF CONTAMINANTS FROM GAS STREAMS

(75) Inventors: Naresh J. Suchak, Glen Rock, NJ (US); Shyam K. Nadkarni, Woodmere, NY (US); Robert Edward Kelton, Pompton Plains, NJ (US); John M. Koltick, Jr., Bethel Park, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 422 days.

(21) Appl. No.: 10/948,928

(22) Filed: Sep. 24, 2004

(65) Prior Publication Data

US 2005/0084436 A1    Apr. 21, 2005

Related U.S. Application Data

(60) Provisional application No. 60/512,469, filed on Oct. 17, 2003.

(51) Int. Cl.
B01D 53/50    (2006.01)
B01D 53/56    (2006.01)
B01D 53/64    (2006.01)
B01D 53/68    (2006.01)

(52) U.S. Cl. ............ 423/210; 423/219; 423/235; 423/240 R; 423/242.1; 423/243.01

(58) Field of Classification Search ........ 423/210, 423/219, 235, 240 R, 242.1, 243.01
See application file for complete search history.

(56) References Cited

U.S. PATENT DOCUMENTS

| | | | |
|---|---|---|---|
| 3,957,949 A | 5/1976 | Senjo et al. | |
| 3,997,415 A | 12/1976 | Machi et al. | |
| 4,011,298 A | 3/1977 | Fukui et al. | |
| 4,035,470 A | 7/1977 | Senjo et al. | |
| 4,107,271 A | 8/1978 | Atsukawa et al. | |
| 4,119,702 A | 10/1978 | Azuhata et al. | |
| 4,247,321 A | 1/1981 | Persinger | |
| 4,541,999 A | 9/1985 | Bechthold et al. | |
| 4,564,510 A | 1/1986 | Bechthold et al. | |
| 4,971,777 A | 11/1990 | Firnhaber et al. | |
| 5,206,002 A | 4/1993 | Skelley et al. | |
| 5,316,737 A | 5/1994 | Skelley et al. | |

(Continued)

FOREIGN PATENT DOCUMENTS

EP    1 332 786 A2    8/2003

OTHER PUBLICATIONS

Database WPI, Section Ch, Week 197811, Derwent Publications Ltd., London, GB; Class E36, AN 1978-20411A, XP002167491 for Japanese Patent JP 53 011164 A.

(Continued)

*Primary Examiner*—Timothy C. Vanoy
(74) *Attorney, Agent, or Firm*—Philip H. Von Neida

(57) ABSTRACT

The present invention provides for a method and apparatus for removing contaminants from a gas stream such as a flue gas stream from an industrial process. The process utilizes a prescrubber to contact the gas stream before the gas stream contacts an oxidizer in an oxidizer zone. The oxidized gas is then treated to either a first and second scrubber operation or just a single scrubber operation.

32 Claims, 4 Drawing Sheets

U.S. PATENT DOCUMENTS

| | | | |
|---|---|---|---|
| 5,639,434 A * | 6/1997 | Patrikainen et al. | 423/235 |
| 5,985,223 A | 11/1999 | Saxena et al. | |
| 6,117,403 A * | 9/2000 | Alix et al. | 423/210 |
| 6,136,284 A | 10/2000 | Hwang et al. | |
| 6,162,409 A | 12/2000 | Skelley et al. | |
| 6,197,268 B1 | 3/2001 | Hwang et al. | |
| 6,231,824 B1 | 5/2001 | Tseng et al. | |
| 6,649,132 B1 * | 11/2003 | Hwang et al. | 423/210 |
| 6,761,863 B2 * | 7/2004 | Hwang et al. | 423/235 |
| 2003/0175190 A1 | 9/2003 | Duncan et al. | |

OTHER PUBLICATIONS (Ishikawajima Harima Heavy Ind), Feb. 1, 1978 "abstract".

S.K. Nelo, K.M. Leskela and J.J.K. Sohlo, "Simultaneous Oxidation of Nitrogen Oxides and Sulfur Dioxide with Ozone and Hydrogen Peroxide," Chem. Eng. Technol. vol. 20, pp. 40-42 (1997).

K.R. Jethani, N.J. Suchak and J.B. Joshi, "Selection of Reactive Solvent for Pollution Abatement of NOx," Gas Separation & Purification, vol. 4, pp. 8-28 (Mar. 1990).

Young Sun Mok, Jae Hak Kim, In-Sik Nam and Sung Won Ham, "Removal of NO and Formation of Byproducts in a Positive-Pulsed Corona Discharge Reactor," Industrial and Engineering Chemistry Research, vol. 39, No. 10, pp. 3938-3944 (2000).

M. Rozoy, C. Postel and V. Puech, "NO Removal in a Photo-Triggered Discharge Reactor," Plasma Sources Science Technology, vol. 8, pp. 337-348 (1999).

C. Tseng, T.C. Keener, J. Lee and S. Khang "Enhanced Effect of In-Situ Generated Ammonium Salts Aerosols on the Removal of NOx from Simulated Flue Gas," Environmental Science and Technology, vol. 35 (15), pp. 3219-3224 (2001).

N.J. Suchak, K.R. Jethani and J.B. Joshi "Absorption of Nitrogen Oxides in Alkaline Solutions: Selective Manufacture of Sodium Nitrite," Ind. & Eng. Chem. Res., vol. 29, No. 7, pp. 1492-1502 (1990).

Y. Fu, U.M. Diwekar and N.J. Suchak, "Optimization Framework for Modeling the Low Temperature Oxidation Process for NOx Reduction," Advances in Environmental Research, vol. 3 (4), pp. 424-438 (2000).

M.P. Pradhan, N.J. Suchak, P.R. Walse and J.B. Joshi "Multicomponent Gas Absorption with Multiple Reactions: Modelling and Simulation of NOx Absorption in Nitric Acid Manufacture," Chemical Engineering Science, vol. 52, No. 24, pp. 4569-4591 (1997).

N.J. Suchak and J.B. Joshi "Simulation and Optimization of NOx Absorption System in Nitric Acid Manufacture," AlChE Journal, vol. 40, No. 6, pp. 944-956 (Jun. 1994).

K.R. Jethani, N.J. Suchak and J.B. Joshi "Modeling and Simulation of a Spray Column for NOx Absorption," Computers and Chem. Eng., vol. 00, No. 0, pp. 1-15 (1992).

N.J. Suchak, K.R. Jethani and J.B. Joshi "Modeling & Simulation of NOx Absorption in Pilot-Scale Packed Columns," AlChE Journal, vol. 37, No. 3, pp. 323-339 (Mar. 1991).

* cited by examiner

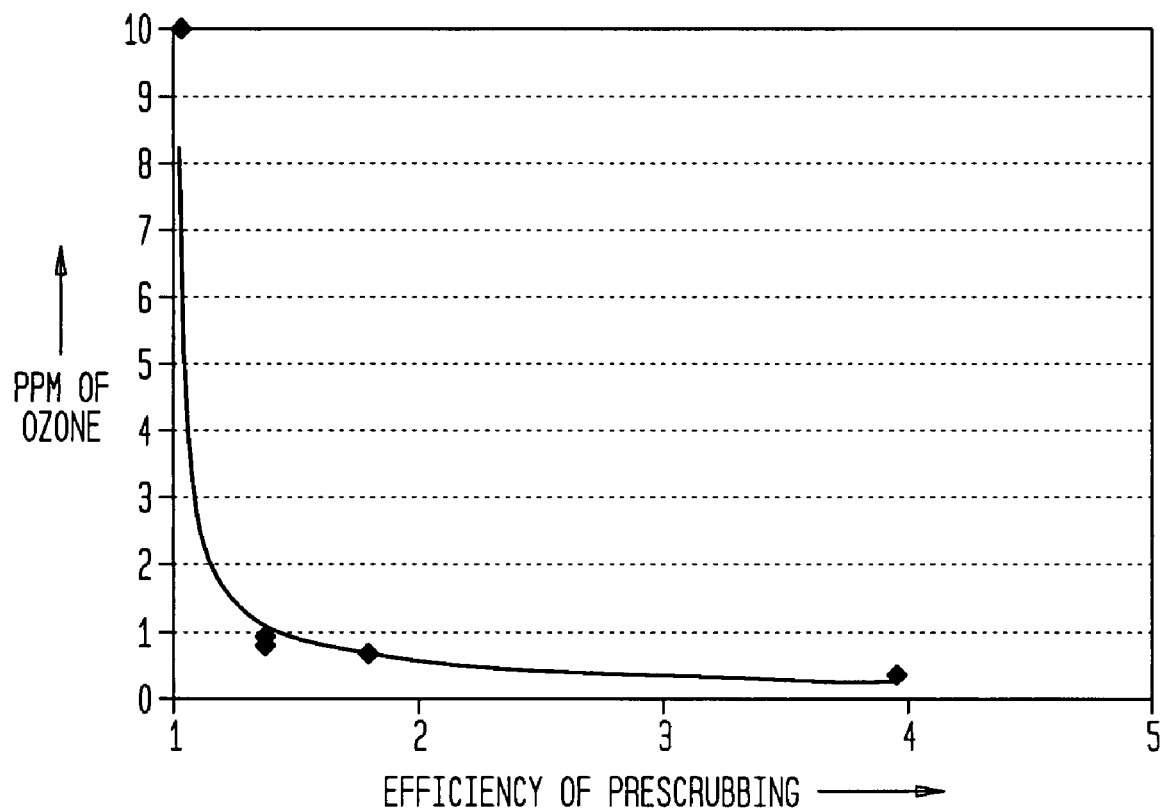

US 7,303,735 B2

PROCESS FOR THE REMOVAL OF CONTAMINANTS FROM GAS STREAMS

This application claims priority from U.S. Provisional Patent Application Ser. No. 60/512,469 filed Oct. 17, 2003.

BACKGROUND OF THE INVENTION

The present invention provides for an improved process for separating and removing nitrogen oxides, sulfur oxides, heavy metals and other contaminants from exhaust gases. These exhaust gases include those that originate from any full or partial combustion source, thermal processes, and process off gases from fossil fuel fired boilers, furnaces, incineration plants, refining, petroleum and petrochemical plants, inorganic, organic, fine and bulk chemical production plants.

Recent federal and local environmental laws require very significant reduction of discharge of harmful gaseous substances into the atmosphere. Chief among such harmful air pollutants are nitrogen oxides ($NO_x$). In response to strict enforcement efforts of these laws, industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents.

Another known method of removing $NO_x$ from gas streams involves contacting the $NO_x$ with ozone, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002; 5,316,737; 5,985,223; and 6,197,268, the disclosures of which are incorporated herein by reference.

Additionally, the Environmental Protection Agency has presented information showing mercury levels in the environment are at levels that are likely to lead to adverse health effects. Coal-fired utility boilers are one of the largest sources of harmful anthropogenic mercury emissions but also include the $NO_x$ and $SO_x$ emissions sources. The present inventors have discovered a process whereby heavy metals as well as $NO_x$ and $SO_x$ can be removed from the emission from a variety of industrial processes.

SUMMARY OF THE INVENTION

The present invention provides for a method that comprises the selective absorption of contaminants preceding and following the ozone addition. This concept results in a highly effective multi-pollutant removal system with improved performance at reduced operating and capital costs.

The present invention is adaptable to treat exhaust or process gas streams generated from a variety of sources. More specifically but not limited to this ability is the ability of this invention to separate and remove $NO_x$, $SO_x$, HCl, Hg and other contaminants from the exhaust stream arising from full or partial combustion sources, thermal processes, process off gas, processes, etc. These include and are not limited to fossil fuel fired boilers, furnaces, incineration plants, refining, petroleum and petrochemical plants, inorganic and organic, fine and bulk chemical plants. Furthermore, the apparatuses may also be used as a polishing system to remove $NO_x$, $SO_x$, HCl, Hg and other contaminants from exhaust streams treated by other methods which are unable to achieve very low removal levels that are attainable by this invention.

A first advantage of this invention is to provide a method and apparatus for removing $NO_x$, $SO_x$, HCl, Hg and other contaminants from the exhaust gas that not only meet present need but also comply with future environmental standards and to do it without causing any secondary emissions of oxidants. This contaminant laden exhaust stream can arise from full or partial combustion sources, thermal processes, process off gas, etc., including but not limited to fossil fuel fired boilers, furnaces, incineration plants, refining, petroleum and petrochemical plants, inorganic and organic, fine and bulk chemical plants.

A second advantage of the invention is to provide an economical improvement both in terms of operating and capital expenditures for very low level removal of nitrogen oxides, sulfur oxides, acid gases, Hg and other contaminants from the untreated flue gas.

BRIEF DESCRIPTION OF THE DRAWINGS

FIG. 1 is a system flow diagram showing a prescrubber, a demisting section followed by separate vessels for oxidation and two step scrubbing sections interconnected by ducts.

FIG. 2 is a system flow diagram that shows a prescrubber, a demisting section followed by a separate vessel for oxidation and a single scrubbing section interconnected by ducts.

FIG. 3 is a system flow diagram that shows integrated demisting, oxidation, and the two step scrubbing sections.

FIG. 4 is a graph showing the effect of prescrubbing on secondary emissions.

DETAILED DESCRIPTION OF THE INVENTION

Figure 1:
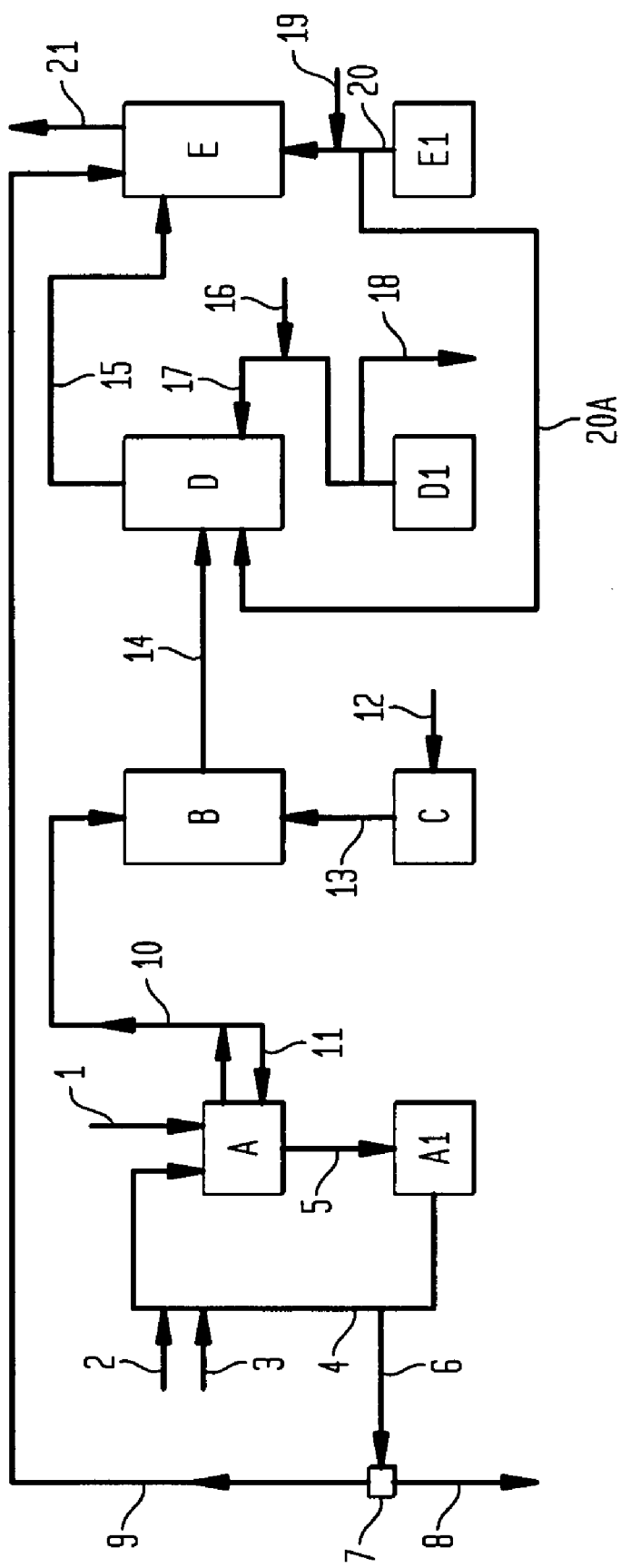
FIGS. 1 through 3 are schematic drawings depicting the present invention. All configurations are for separating and removal of nitrogen oxides, sulfur oxides, heavy metals and other contaminants from the exhaust gases originating from any type of full or partial combustion sources, thermal processes, process off gas, from processes, etc., including but not limited to fossil fuel fired boilers, furnaces, incineration plants, refining, petroleum and petrochemical plants, inorganic and organic, fine and bulk chemical plants. These drawings are as follows.

The present invention relates to treatment and removal of $NO_x$, $SO_x$, HCl, Hg, and other contaminants from an exhaust gas stream. This invention, in particular, relates to flue gas containing $SO_2$ which is partially prescrubbed along with other contaminants to render the flue gas conducive to treatment with ozone. Such a prescrubber using an aqueous stream with controlled $SO_2$ absorption is configured to minimize formation and carryover of fine droplets in the prescrubber exhaust. The droplets that do entrain in the prescrubber exhaust flue gas are physically separated or demisted by a variety of means. The demisted prescrubber exhaust enters an oxidizer where it is brought in contact and mixed with chemical oxidant such as ozone.

The ozone at a preselected molar ratio and at the preselected residence time of the oxidizer, transforms the $NO_x$ to higher orders of nitrogen oxides. Higher orders of nitrogen oxides are more reactive and readily soluble in most types of aqueous solutions. Oxidative conditions in the oxidizer also cause oxidation of other contaminants in the flue gas including but not limited to elemental Hg (mercury). The oxidized flue gas is then scrubbed selectively with aqueous stream in the main scrubber, which can be counter flow type, cross flow type or cocurrent type.

Pre-scrubbing of the flue gas offers numerous advantages such as:
1. Generation of sulfite or sulfurous acid necessary for scavenging residual ozone from the scrubbed flue gas;
2. Reducing the ozone requirement for higher degree of $NO_x$ removal;
3. Facilitate conditions favoring oxidation and removal of mercury and other contaminants;
4. Reducing emissions of $NO_2$ in the treated flue gas.

The process in the present invention comprises the following steps: The exhaust gas in the temperature range of 40° F. to 850° F. with contaminants is directed via duct to a prescrubber or a prescrubbing section. An evaporative cooler is generally added when the temperature preceding the prescrubber exceeds about 1100° F.

In the prescrubber or prescrubbing section, exhaust gas is brought in contact with an aqueous solution in such a fashion so as to cause preferential scrubbing of some or substantial parts of $SO_2$, most of the highly soluble gases and other contaminants. Absorption of $SO_2$ results in the formation of sulfite, bisulfite, and or sulfurous acid into the aqueous phase. As absorption of $O_2$ causes sulfite to oxidize to sulfate and $O_2$ being far less soluble then $SO_2$, the design of the prescrubber minimizes the absorption of $O_2$. By manipulating pH, transfer area, and the contact time, selectivity of mass transfer with respect to $SO_2$ is improved. The contact between the gas and the liquid phase in the prescrubber increases the water vapor content of the prescrubbed flue gas. In the case when flue gas is hotter than the contacting aqueous stream, this contact between gas and liquid results in simultaneous quenching along with absorption.

Quenching raises partial pressure of water vapor in the flue gas. All of these effects due to prescrubbing of the flue gas provide numerous advantages, including but not limited to generating sulfite solution needed for abating residual ozone; increasing water content of the flue gas entering the oxidizer to improve oxidative conditions; reducing $SO_2$ and HCl content of the flue gas entering the oxidizer to improve oxidative conditions while making it possible to construct most of the oxidizer out of non-exotic materials; reducing $SO_2$ content of prescrubbed gas stream; a highly oxidizing condition is created in the oxidizer improving oxidation of elemental mercury; providing the conditions to perform selective absorption of flue gas and other components in the scrubber; and avoiding absorption of NO in sulfite solution thereby forming the complex that has the potential to revert to NO.

The prescrubbed gas is first demisted to remove droplets of aqueous solutions entrained in the gas stream exiting the prescrubber. This demisting is enabled by the geometrical arrangement of flow entering the demisting section. Droplets may also be separated by either twisting and turning of flue gas induced by the liquid flow of the prescrubber or by introducing objects generally known as demister or mist eliminator downstream of the prescrubber.

Flue gas leaving the demisting section enters an oxidizer of preselected residence time to allow the ozone injected in the oxidizer to mix and react with $NO_x$ in the flue gas. The instantaneous and selective oxidation of $NO_x$ by ozone generates higher order oxides of nitrogen that are readily soluble in numerous aqueous solutions. A few other contaminants such as mercury (Hg) also oxidize in the oxidizer. Eliminating or reducing aqueous solution droplet carryover is crucial in improving the efficiency with respect to ozone consumption and the consequent chemistry of absorption. It should be noted that to achieve low emissions of $NO_x$, oxidant in excess of stoichiometry is needed. This is made economically feasible by the method and apparatus of this invention which scrubs the excess oxidant such as ozone.

The flue gas stream exiting the oxidizer is treated in the first step scrubber or the first step scrubber where the oxidized form of $NO_x$, remainder of $SO_2$, oxidized form of mercury and other contaminants are scrubbed with an aqueous stream. The $NO_x$ and SOx in the oxidized flue gas on contacting the aqueous stream of the first step scrubber generate oxyacids. These oxyacids further continue the oxidative reactions, which are extremely conducive to further oxidize mercury and other contaminants. To maintain the required oxidative and absorption chemistry of gases, mercury, and other contaminants, a reagent of predetermined quantity is added. This reagent can be ammonia or alkali metal or alkaline earth metal oxides, carbonates, oxides or hydroxides. Consequently, complex salts are generated in the first step scrubber.

As noted before, to achieve low emissions of $NO_x$, oxidant in excess of stoichiometry is needed and therefore a second scrubber or second step scrubber is needed for scrubbing the excess ozone. In addition, for efficient mercury removal, the two step scrubbing approach is essential. The scrubbed flue gas which is substantially free from contaminants and oxidant is conveyed through a mist elimination section before safely exhausting to atmosphere.

The flue gas flow can be as little as few hundreds of standard cubic feet per minute generated by industrial processes or as high as millions of cubic feet per minute generated by coal fired boilers engaged in large electric power generation. For example, as shown in FIG. 1, the flue gas stream 1 ducted to the prescrubber could be from more than one coal fired boilers with flow totaling in excess of 10 million lbs/hr. This prescrubber in actual practice can be a vessel mounted separately on a structure or a section of duct modified to provide functionality described in detail.

Based on the present state of knowledge about ozone generation and attainable power efficiencies, it is evident that ozone based technology may be economically less attractive when compared with combustion modification or reduction based technology using ammonia. Ozone generation requires about 10 to 14 kW per kilogram of ozone.

Oxidation of NOx with ozone and subsequent high removal of $NO_x$ to low levels in a scrubber has been demonstrated. The treated gas stream from such a unit has been reported to have less than two (2) ppmv of NOx. Due to its ability to reach very low levels of $NO_x$ and simultaneously oxidize other contaminants both organic and inorganic, there exists an applicability of this process as an end of the pipe treatment system. This process can be applied in combination with other $NO_x$ control measures or technologies, which may be used upstream in the treatment of exhaust or flue gas stream.

To meet the increasing need to lower the pollutant levels in the exhaust gases, ozone based oxidation processes will provide an effective solution. However, to achieve these low levels of pollutants, the ozone dosage will need to be in excess of the stoichiometry so that the oxidation and removal by scrubbing is possible in the new or retrofitted equipment. This excess ozone in the treated gas stream emitted to the atmosphere is not desirable. Skelley et al., U.S. Pat. No. 5,316,737 therefore, recommended use of sulfite solution formed in situ or adding the sulfite solution in the ultimate scrubbing step before exhausting to the atmosphere.

The prescrubber used in this invention is a device where gas and liquid is put in contact to cause the selective transfer of components from the gas to the liquid phase. Prescrubbing inadvertently can cause cooling which may or may not be beneficial to the oxidation of $NO_x$ (Skelley et al.) depending on degree of cooling, temperature of the untreated flue gas, moisture content of flue gas, etc. The principal intent of prescrubbing is to selectively scrub part or most of the $SO_2$ to effectively generate sulfite solution, which not only reduces ozone consumption but also depletes the residual ozone concentration in the treated flue gas stream. Selective scrubbing also prevents absorption of NO in sulfite. Absorption of NO is not desirable as the solution resulting from scrubbing NO needs further processing during which NO could potentially desorb from the solution. The prescrubbing will also increase partial pressure of water vapor in the gas phase so that higher oxides of nitrogen formed in the reactor can be stabilized to form more stable oxyacids of $NO_x$, which assist in further oxidation of Hg to enable stable removal in the scrubber.

Furthermore, the partial removal of $SO_2$ upstream of the main scrubber helps to alleviate the need for oxidation chemistry necessary to prevent re-emission of elemental mercury. Conventional scrubbers and quenchers used in the pollution control industry do not meet the expectations of a prescrubber required for the process claimed in this invention. The solubility of $SO_2$ in an aqueous solution is many order of magnitudes greater than that of $O_2$. Absorption of $SO_2$ in aqueous medium containing alkali or alkaline carbonates or hydroxides, or oxides is enhanced due chemical reaction, so too is the absorption of $O_2$ in presence of sulfite. The actual mechanism of absorption of $SO_2$ and $O_2$ is somewhat complex. Characterization of ease in absorption as a "solubility" oversimplifies the phenomenon, however, it is major factor affecting preferential absorption of $SO_2$ over $O_2$.

In order to cause selective transport of $SO_2$ over other less soluble components, any of the following methods by itself or in combination may be used in no particular order of preference. For example, it may be by contacting gas with swirling liquid over conical surface; flowing gas through a curtain of larger droplets aqueous stream; contacting gas to wetted walls or surfaces of contactors; contacting gas stream with a spray producing larger liquid droplets; dynamically controlling the gas—liquid contact area; contacting gas and liquid followed by effective separation of liquid droplets from the gas phase; and limiting gas liquid contact time.

In this type of selective prescrubber, sprays resulting in fine droplets are generally not preferred because of certain physical limitations, even though fine droplets offer far greater mass transfer area reducing selectivity to more soluble gases such as $SO_2$, HCl, etc. Scrubbing of $SO_2$ produces sulfurous acid in the liquid phase. In the presence of basic compounds, such as ammonia, carbonates, hydroxides, or alkaline earth metals, sulfurous acid transforms to sulfites and bisulfites. Finer droplets also form a mist, which entrains in the fast moving gas stream due to surface drag. These entrained droplets or mist of sulfites, bisulfites, and sulfurous acids are very effective in scavenging ozone and are undesirable in the oxidizer section.

In addition, the fine droplets offer much larger surface area per unit volume of aqueous stream requiring extending treatment time to reduce the entrainment to the oxidizer section. This enables oxygen in the flue gas to be absorbed and thereby convert much needed sulfite of this invention to sulfate salt that plays no role in residual ozone destruction.

To minimize the generation of fine mist and the absorption of oxygen, it is necessary not only to first reduce the gas-liquid contact area but also to reduce the contact time between the flue gas and the aqueous stream, its mist or droplets.

It should be noted that the flue gas exiting such a prescrubber might be partially saturated or fully saturated with water vapor. In order to reduce the liquid droplets from the gas phase exiting the prescrubber, the gas stream needs to be demisted. This demisting may consist of device such as Chevron or wire mesh pad placed in a flue gas path to twist and turn the flue gas stream. Other ways of demisting are to allow the higher momentum of liquid droplets to impact on extended surfaces for the droplets to coalesce and drain down under gravity. When the flue gas has high loading of particulate matters, use of an in-line device may be limited. In such a case, liquid droplets can also be removed by simply setting up motion of flue gas in such a way that majority of droplets fall out due to change in the velocity of the flue gas. Changing either direction or speed of gas flow can cause droplet separation, or in some cases, the combination of both may be gainfully used.

Velocity can be changed by changing geometry of the downstream vessel such as tangential introduction into cylindrical vessel where droplets under centrifugal force contact the cylindrical vessel surface, coalesce and drain down under gravity while the gas travels up in spiral path. Prescrubber sprays introduced to scrub the gas can also cause swirl necessary in the exiting stream. Gases exiting the prescrubber open into large cross section vessel to cause reduction of velocity to allow fallout of larger droplets.

Turning now to the figures, as depicted in FIG. 1, flue gas 1 is selectively scrubbed in a prescrubber A by contacting with liquid stream 4. The prescrubber A has its own liquid recirculation loop by pumping liquid stream 5 back to form 4. This stream 4 is supplemented with alkali feed through line 2 and make up water through line 3 to maintain the desired pH and the solid contents. Some of the liquid from recirculation loop is withdrawn via 9 to feed the scrubber E. Depending on ability of the scrubber to handle solids, a solids rejection device 7 fed through line 6 is placed upstream of feeding the scrubber E. This solids rejection device may be a filter, a hydroclone, a settling tank, etc. The liquid stream from filter 7 can be fed to a filtered solids bed through line 8.

Line 5 will also feed pump A1 which can deliver liquid through line 4 back to prescrubber A. Line 10 leaves the prescrubber A with a small recycle line 11 back to the prescrubber A. Line 10 brings the gas to oxidizer B. Line 14 connects oxidizer B and first step scrubber D. Pump D1 feeds through line 17 to the first step scrubber D.

Line 15 exits first step scrubber D to second step scrubber E which is fed from pump E1 through line 20. Line 21 exits the second step scrubber E and allows gases to be fed to the atmosphere.

It may be noted that in some applications, a separate prescrubbing recirculation loop may not be necessary. Instead of recirculation loop, a part of liquid stream through line 4 may be fed to prescrubber A and the resulting liquid through line 5 is then brought back to the sump of scrubber E.

The ozone generator C receives gas feed stream 12, which is dried air, oxygen, or mixture of air and oxygen. In large applications, use of oxygen is generally found to be more cost effective. Oxygen is generally supplied in a liquid form or produced on site using a cryogenic or non-cryogenic air separation unit. Industrial gas companies worldwide have catered to and tailored the need for oxygen in refining, chemical processing, glass, steel and many other process industries.

Commercially available ozone generators include a single-pass, shell-and-tube heat exchanger, with cooling water on the shell-side and oxygen flowing through the tubes made of stainless steel. Each tube acts as a grounded electrode that houses a high voltage electrode in the center separated by a dielectric and concentric volume through which compressed air or oxygen flows. This high voltage current causes corona discharge, which energizes oxygen molecules and results in the formation of ozone.

The gas stream 12 fed to ozone generator(s) C forms ozone at concentrations ranging from 2 to 18 percent or higher depending on power to electrodes. The ozone containing gas stream 13 is mixed with prescrubbed and demisted gas in the oxidizer vessel B. The injection of ozone is generally upstream of the oxidation vessel. The distribution of the ozone in the flue gas stream is of key importance to ensure proper mixing. If the distribution of ozone is improper, NOx removal efficiency reduces followed by number of problems in the scrubbing that can result in not meeting the objectives of this invention. With advances in the computers and computational techniques, tool based on computational fluid dynamics (CFD), ozone distribution design can be established with greater confidence.

Ozone is introduced in the flue gas stream by an ozone injection grid that ensures adequate distribution of $O_3$ to mix with the flue gas in relatively short time period. As mentioned earlier, ozone is mixed upstream of oxidizer vessel itself. Essentially, oxidation begins after ozone mixes with the flue gas. The oxidation section or oxidation chamber is also denoted as oxidizer B in all three-process schematics. In this chamber B, $NO_x$, $SO_x$, CO and other contaminants are oxidized by the presence of the ozone. Sets of overall reactions that transform NO to $NO_2$, $NO_3$, and $N_2O_5$ in chamber B and oxidize other contaminants are as follows:

$$NO + O_3 \longrightarrow NO_2 + O_2 \tag{1}$$

$$NO_2 + O_3 \longrightarrow NO_3 + O_2 \tag{2}$$

$$NO_3 + NO_2 \Leftrightarrow N_2O_5 \tag{3}$$

$$2NO_2 \Leftrightarrow N_2O_4 \tag{4}$$

$$NO + NO_2 \Leftrightarrow N_2O_3 \tag{5}$$

$$2O_3 \longrightarrow 3O_2 \tag{6}$$

$$SO_2 + O_3 \longrightarrow SO_3 \tag{7}$$

$$CO + O_3 \longrightarrow CO_2 \tag{8}$$

Other contaminants such as elemental mercury also oxidize in the oxidizer.

$$Hg^0 + O_3 \longrightarrow Hg^{-2} + O_2 \tag{9}$$

Since the flue gas is prescrubbed, moisture level or humidity is likely to be higher. In addition to oxidation reactions forming oxy acids of NOx, oxy acids of NOx and SOx will also form in the gas phase, $$N_2O_5 + H_2O(g) \longrightarrow 2HNO_3(g) \tag{10}$$

$$SO_2 + H_2O(g) \Leftrightarrow H_2SO_3(g) \tag{11}$$

$$N_2O_3 + H_2O(g) \Leftrightarrow 2HNO_2(g) \tag{12}$$

Some enhancement is also observed in the oxidation of elemental mercury in presence of nitric acid in the gas phase. However, the presence of $SO_2$ inhibits mercury oxidation. Therefore, it is advantageous to remove part of or a substantial amount of $SO_2$ in the prescrubber. Ozone in the presence of higher moisture content also forms some hydroxyl ($OH^-$) radical which is known to oxidize mercury and other contaminants. The apparent high oxidation rates of mercury oxidation is the cumulative effect of ozone, water vapor and oxy acids of nitrogen. Reactions 1 through 12 represents simplified chemistry of oxidation in homogenous phase in the oxidizer.

Water found in the form of liquid droplets in the oxidizer forms the hetrogeneous phase. NOx, SOx and other contaminants will begin absorbing in the droplets. NOx forms nitrous and nitric acid while absorption of SOx results in sulfurous acid.

$$N_2O_5 + H_2O(l) \longrightarrow HNO_3(l) \tag{13}$$

$$SO_2 + H_2O(l) \longrightarrow H_2SO_3(l) \tag{14}$$

$$HNO_3(g) \longrightarrow HNO_3(l) \tag{15}$$

$$H_2SO_3(g) \longrightarrow H_2SO_3(l) \tag{16}$$

$$HNO_2(g) \longrightarrow HNO_2(l) \tag{17}$$

Many other reactions such as following also contribute some minor amount of NOx removal.

$$N_2O_4 + H_2O(l) \longrightarrow HNO_3(l) + HNO_2(l) \tag{18}$$

$$2NO_2 + H_2O(l) \longrightarrow HNO_3(l) + HNO_2(l) \tag{19}$$

$$N_2O_3 + H_2O(g) \longrightarrow 2HNO_2(l) \tag{20}$$

Some of the nitrous acid decomposes due to instability in the aqueous phase.

$$3HNO_2(l) \longrightarrow HNO_3(l) + 2NO(g) + 2H_2O \tag{21}$$

In presence of alkali, alkaline earth metals or basic compounds, respective nitrate and sulfites are formed in those droplets.

$$2HNO_3(l) + Na_2CO_3(l) \longrightarrow 2NaNO_3(l) + H_2O(l) + CO_2 \tag{22}$$

$$H_2SO_3(l) + Na_2CO_3(l) \longrightarrow 2Na_2SO_3(i) + H_2O(l) + CO_2 \tag{23}$$

$$2HNO_2(l) + Na_2CO_3(l) \longrightarrow 2NaNO_2(l) + H_2O(l) + CO_2 \tag{24}$$

Solubility of oxygen and ozone is very limited in the aqueous phase. Due to the chemical reaction in the liquid phase, mass transport of oxygen and ozone from gas phase to liquid phase increases. In particular, absorption of ozone in these droplets is dramatically enhanced by sulfites or sulfurous acid already present and formed in the the oxidizer. This substantially increases consumption of ozone which is highly undesirable.

$$O_3(l) + Na_2SO_3(l) \longrightarrow 2Na_2SO_4(l) + O_2 \tag{25}$$

$$O_3(l) + NaNO_2(l) \longrightarrow NaNO_3(l) + O_2 \tag{26}$$

The principal reactions of ozone in oxidation of NOx are NO oxidation to $NO_2$ as depicted by reaction (1) and $NO_2$ oxidation further to $NO_3$ as depicted by reaction (2). Since the former reaction is faster than latter, ozone deficiency will leave $NO_2$ partly unoxidized. This can be somewhat compensated by the addition of ozone in excess of stoichiometry. SOx removed as sulfite in the oxidizer by absorption on liquid droplet is now not available in the scrubber E for scavanging unreacted oxidant. For this reason, it is advantageous to have oxidizer flue gas substantially free of liquid droplets.

The oxidized gas stream exiting the oxidizer is then introduced in the scrubber D where it is contacted with aqueous liquid stream. The scrubbing can be single step or multi step. In a dual step process, chemistry of scrubbing medium in the first step 4 is oxidative while the second step is rich in sulfite. The scrubbers can be packed column, spray column, plate column, tray column, cross flow, counter current or co-current. It is believed that each step of absorption can consist of more than one "Theoretical Stage of Mass Transfer". Highly oxidized forms of NOx such as $N_2O_5$, $NO_3$ and other extremely soluble gases that escape the prescrubber A such as HCl, HF are scrubbed at very first contact with the liquid and therefore the part of the first step that comes in contact with gas earliest is the most acidic and oxidative zone or a plane. With a prescrubber, some or a part of SOx has already been removed. In addition, $SO_2$ is far less soluble than oxidized form of NOx.

Hence, due to the prescrubber and improved process of oxidation, a highly oxidative and acidic zone could be created which is critical in improving capture and stabilization of mercury. In the scrubbing step, some oxidation within the gas phase continues while dissolution of contaminants occur in the liquid. Once the desired amount of $NO_x$ is absorbed, less soluble $SO_2$ absorption proceeds. The chemistry of dissolution of all these gases is described in the reactions (13) through (24). The absorption of remainder of $SO_2$ produces sulfites. It is well reported in both published (Jethani et al.) and patented literature that less oxidized form of NOx can be removed by scrubbing with sulfite solution. In particular, sulfite is effective in the removal of $NO_2$. The less oxidized form of NOx at this step mainly comprises NO and $NO_2$. NO is colorless while $NO_2$ is dark brown in color and in the treated gas stream contributes to opacity. Therefore, differing $SO_2$ absorption to the latter zone brings three additional advantages as follows it helps to scavenge residual ozone; it further reduces level of $NO_x$ in the gas stream leaving this scrubber step and it reduces opacity of treated gas stream.

As depicted in FIG. 1, the scrubbing section comprises two steps. The sulfite rich stream from prescrubber A is fed to the second scrubber E of the scrubbing system. In an individual case, line 9 may be fed to the sump of second scrubber E. The liquid stream bleed 20A from second step is conveyed to the first step of the scrubbing section. As mentioned above to maintain the reducing chemistry and to enhance capture of $SO_2$, pH is continuously monitored and adjusted by alkali feed 19. In the first step scrubber D, highly oxidized NOx, some ozone and highly soluble gases are scrubbed out. The alkali feed line 16 provides adjustment of pH to maintain desired chemistry in this scrubbing step. Bleed from this stage is conveyed by line 18 to a waste water treatment plant. Unlike conventional scrubbers since bleed is from the most oxidative step, COD (chemical oxygen demand) of the waste stream is low, minimizing the power intensive need of oxidative treatment. The configurations shown in FIG. 1 and FIG. 3 are preferred arrangements for a two step scrubbing system.

Figure 2:
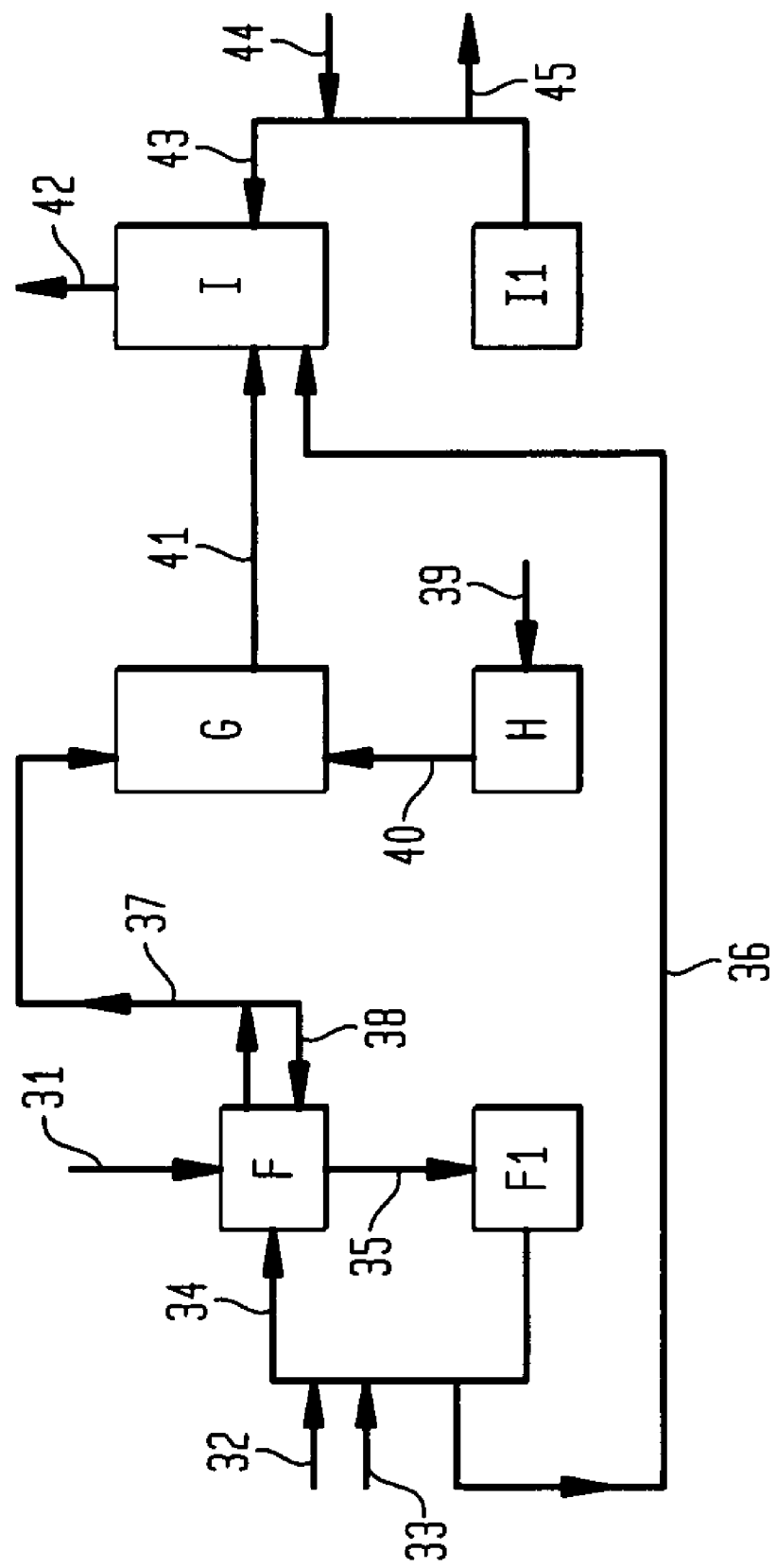

Turning to FIG. 2, source flue gas 31 is fed to the pre-scrubber F. Recycled from the pre-scrubber travels through line 35 to pump F1 which recycles through line 34 back to the pre-scrubber. Make up water and alkali feed enter through lines 33 and 32 respectively. The gas stream exits the pre-scrubber F through line 37 with a recycle line 38 also returning captured liquid entrained in the gas stream back to the pre-scrubber F. Line 37 enters the oxidizer G which is fed ozone from the ozone generator H which is fed oxygen through line 39 and feeds the oxygen and ozone mixture to the oxidizer G through line 40. Line 41 leads to the wet scrubber I which is fed via pump I1 through line 43. Alkali feed travels through line 44 to the liquid feed line 43 and the scrubbed gases are released to the atmosphere through line 42. The wet scrubber I may also be fed from the liquid feed line 34 through line 36.

Figure 3:
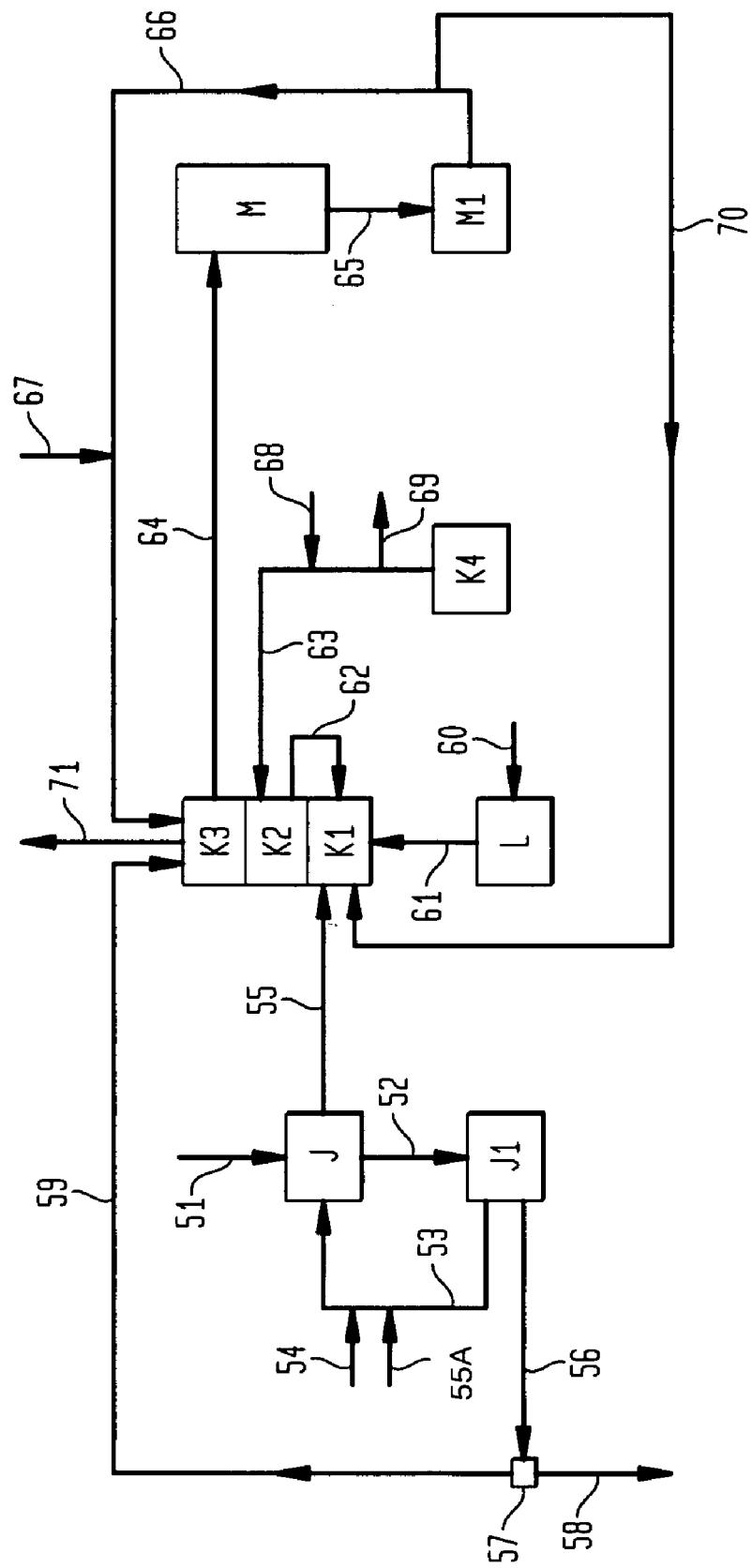

In FIG. 3, flue gas is fed to the pre-scrubber J through line 51. Alkali and make up water are fed through lines 54 and 55A respectively to line 53 which feeds the pre-scrubber J. Scrubbed liquid passes through line 52 to pump J1 and can be recirculated back to the scrubber J through line 53 or delivered to the second step scrubber K3 through line 59. Line 56 exits pump J1 through line 56 to a filter assembly 57 which has a filtered solids bleed line 58 and also the feed line 59 exiting from it. Line 55 delivers the flue gas to oxidizer K1 which receives an ozone and oxygen mixture through line 71 from ozone generator L which receives oxygen feed through line 60. Line 62 connects the oxidizer K1 with the first step scrubber K2. Scrubber K2 is also adjacent second step scrubber K3 which will release the scrubbed gases to the atmosphere through line 71. Pump K4 feeds the first step scrubber K2 through line 63 which is fed alkali through line 68 and through which bleeds to a waste water treatment plant exits through line 69. Some scrubbed solution exits second stage scrubber K3 is through line 64 which connects to a recycle tank M. Line 65 exits the recycle tank to pump M1 which will pump liquid through line 66 back to the second step scrubber K3. Alkali feed may also be inputted into this liquid through line 67. Alternatively this liquid feed from line 66 may be diverted through line 70 back to the oxidizer K1 for further treatment.

In another embodiment, instead of a sodium based reagent, lime or limestone based reagents are used in pre-scrubbing as well as scrubbing section. When a limestone based reagent is used, recirculating solution from scrubber D is oxidized with air. Alkali scrubbing, i.e. sodium or potassium based reagent is more prevelant in industrial and petrochemical applications. In a further embodiment, combination of alkali and alkaline earth metal salts are used where alkali is recycled and alkaline earth metal salts of oxy acids of sulfur and nitrogen are separated with alkaline earth metal carbonates/hydroxides replenished. In one example, flue gas stream with 2,420 scfm of flow with 24.2 ppm of NOx (almost all NO) was treated with ozone in an oxidizer. The gas exiting the oxidizer was scrubbed with a sodium carbonate solution. In the scrubbing section D there was no sulfite present, there was 9.8 ppm of residual ozone with 7.5 ppm of $NO_2$ in the flue gas stream entering scrubbing section E. Sodium sulfite present in recirculating liquid of section E eliminated almost all residual ozone to less than 0.38 ppm and decreased $NO_2$ emissions to less than 2 ppm to atmosphere. As shown in FIG. 4, with an increase in prescrubber efficiency, there is an increase in NOx removal efficiency and significant decrease in residual ozone emitted to the atmosphere.

While this invention has been described with respect to particular embodiments thereof, it is apparent that numerous other forms and modifications of the invention will be obvious to those skilled in the art. The appending claims in this invention generally should be construed to cover all such obvious forms and modifications which are within the true spirit and scope of the present invention.

Having thus described the invention, what we claim is:

1. A process for removing contaminants from a gas stream comprising the steps:
   (a) feeding said gas stream into prescrubber containing an aqueous alkali solution, wherein said prescrubber selectively converts oxides of sulfur into sulfites, bisulfites or sulfurous acid;
   (b) feeding said gas stream from said prescrubber and an ozone stream into an oxidizer zone wherein ozone is fed in an amount which is in stoichiometric excess to the amount of nitrogen oxides present in said gas stream;
   (c) feeding said gas stream from said oxidizer zone to a first scrubber wherein an oxidative condition is maintained in said first scrubber; and
   (d) feeding said gas stream from said first scrubber into a second scrubber containing a sulfite solution.

2. The process as claimed in claim 1 wherein said contaminants are selected from the group consisting of nitrogen oxides, sulfur oxides, acid gases and heavy metals.

3. The process as claimed in claim 2 wherein said acid gases are hydrochloric acid.

4. The process as claimed in claim 1 wherein said gas stream is a flue gas stream.

5. The process as claimed in claim 4 wherein said flue gas stream is from a fossil fuel fired furnace or utility boiler flue gas stream.

6. The process as claimed in claim 1 wherein said nitrogen oxides are selected from the group consisting of nitric oxide and nitrogen dioxide.

7. The process as claimed in claim 1 wherein said heavy metals are mercury.

8. The process as claimed in claim 1 wherein said gas stream is demisted.

9. The process as claimed in claim 1 wherein said oxidizer zone oxidizes said nitrogen oxides and said heavy metals.

10. The process as claimed in claim 1 wherein said oxidative condition oxidizes said nitrogen oxides and said sulfur oxides to form oxyacids.

11. The process as claimed in claim 1 wherein a reagent is added to said first scrubber to maintain said oxidative conditions.

12. The process as claimed in claim 11 wherein said reagent is selected from the group consisting of ammonia, alkali metal or alkaline earth metal oxides, carbonates, and hydroxides.

13. The process as claimed in claim 1 wherein said second scrubber will remove the remaining ozone from said gas stream.

14. The process as claimed in claim 1 wherein the concentration of said ozone is from about 2 to about 18 percent by weight.

15. The process as claimed in claim 1 wherein said ozone is fed to said oxidizer zone in an amount of greater stoichiometry than the amount of nitrogen oxides present in said gas stream.

16. The process as claimed in claim 1 wherein said oxidizer zone, said first scrubber and said second scrubber are contained in a vessel.

17. The process as claimed in claim 16 wherein said vessel contains three layers and each of said three layers corresponds to said oxidizer zone, said first scrubber and said second scrubber.

18. The process as claimed in claim 17 wherein said oxidizer zone is the bottom level and said second scrubber is the top level.

19. A process for removing contaminants from a gas stream comprising the steps:
   (a) feeding said gas stream into prescrubber containing an aqueous alkali solution, wherein said prescrubber selectively converts oxides of sulfur into sulfites, bisulfites or sulfurous acid;
   (b) feeding said gas stream from said prescrubber and an ozone stream into an oxidizer zone wherein ozone is fed in an amount which is in stoichiometric excess to the amount of nitrogen oxides present in said gas stream; and
   (c) feeding said gas stream from said oxidizer zone to a first scrubber, wherein an oxidative condition is maintained in said first scrubber.

20. The process as claimed in claim 19 wherein said contaminants are selected from the group consisting of nitrogen oxides, sulfur oxides, acid gases and heavy metals.

21. The process as claimed in claim 20 wherein said nitrogen oxides are selected from the group consisting of nitric oxide and nitrogen dioxide.

22. The process as claimed in claim 20 wherein said acid gases are hydrochloric acid.

23. The process as claimed in claim 20 wherein said heavy metals are mercury.

24. The process as claimed in claim 19 wherein said gas stream is a flue gas stream.

25. The process as claimed in claim 24 wherein said flue gas stream is from a fossil fuel fired furnace or utility boiler flue gas stream.

26. The process as claimed in claim 19 wherein said gas stream is demisted.

27. The process as claimed in claim 19 wherein said oxidizer zone oxidizes said nitrogen oxides and said heavy metals.

28. The process as claimed in claim 19 wherein said oxidizer zone oxidizes said nitrogen oxides and said sulfur oxides to form oxyacids.

29. The process as claimed in claim 19 wherein a reagent is added to said first scrubber to maintain said absorptive conditions.

30. The process as claimed in claim 29 wherein said reagent is selected from the group consisting of ammonia, alkali metal or alkaline earth metal oxides, carbonates, and hydroxides.

31. The process as claimed in claim 19 wherein the concentration of said ozone is from about 2 to about 18 percent by weight.

32. The process as claimed in claim 19 wherein said ozone is fed to said oxidizer zone in an amount of greater stoichiometry than the amount of nitrogen oxides present in said gas stream.

* * * * *